United States Patent [19]

Kershaw

[11] Patent Number: 4,580,662
[45] Date of Patent: Apr. 8, 1986

[54] BRAKING APPARATUS

[75] Inventor: Robert Kershaw, Gold Coast, Australia

[73] Assignee: Robert Kershaw International Pty., Ltd., Queensland, Australia

[21] Appl. No.: 618,683

[22] Filed: Jun. 8, 1984

[30] Foreign Application Priority Data

Jun. 15, 1983 [AU] Australia .............................. PF9807
Jul. 21, 1983 [AU] Australia .............................. PG0413
Oct. 28, 1983 [AU] Australia .............................. PG2110

[51] Int. Cl.⁴ ............................................. B60T 1/04
[52] U.S. Cl. .............................. 188/4 R; 242/84.1 R; 254/277
[58] Field of Search ............................. 188/4 R, 4 B; 244/110 A, 110 C, 110 H; 242/84.1; 254/277

[56] References Cited

U.S. PATENT DOCUMENTS

| 887,551 | 5/1908 | Vanderbilt | 188/4 R |
|---|---|---|---|
| 1,496,302 | 6/1924 | Denburger | 188/4 R |
| 1,773,762 | 8/1930 | Strano | 188/4 R |
| 2,224,785 | 12/1940 | Greene | 188/4 R |
| 2,367,214 | 1/1945 | Hedge | 242/84.1 L X |
| 2,410,592 | 11/1946 | Wread, Sr. | 188/4 R |
| 2,718,283 | 9/1955 | Ropp | 188/4 R |
| 2,746,570 | 5/1956 | Stahmer | 188/4 R |
| 2,868,333 | 1/1959 | Willison | 188/4 R |
| 2,957,641 | 10/1960 | Humphrey | 242/84.1 L X |
| 2,960,191 | 11/1960 | Roberts | 188/4 R |
| 3,013,750 | 12/1961 | Fonden et al. | 244/110 C |
| 3,078,963 | 2/1963 | Shea | 188/4 R |
| 3,563,489 | 2/1971 | Coshow | 242/84.1 L X |
| 3,870,245 | 3/1975 | Witteborg, Jr. | 242/84.1 L X |
| 4,386,681 | 6/1983 | Skelton | 188/4 R |

FOREIGN PATENT DOCUMENTS

| 222429 | 11/1957 | Australia . | |
|---|---|---|---|
| 272450 | 6/1966 | Australia . | |
| 68180 | 3/1974 | Australia . | |
| 507319 | 10/1975 | Australia . | |
| 524553 | 5/1978 | Australia . | |
| 852343 | 10/1952 | Fed. Rep. of Germany | 188/4 R |
| 912304 | 1/1955 | Fed. Rep. of Germany . | |
| 1119191 | 6/1956 | France . | |
| 1524201 | 5/1968 | France . | |
| 472131 | 6/1952 | Italy . | |
| 482534 | 7/1953 | Italy . | |
| 96114 | 9/1922 | Switzerland | 188/4 R |
| 17907 | of 1906 | United Kingdom | 188/4 R |
| 1100536 | 1/1968 | United Kingdom | 188/4 R |

Primary Examiner—George E. A. Halvosa
Attorney, Agent, or Firm—Stevens, Davis, Miller & Mosher

[57] ABSTRACT

A vehicle braking apparatus includes a braking mat assembly, a mounting unit for securing the mat assembly to the vehicle chassis, and a shock absorbing unit. The mat assembly includes a drum mounted on a shaft and a braking mat. The braking mat has a first portion secured to and wound around the shaft, an apron portion and a second portion intermediate the apron portion and the first portion. The apron portion forms an extension which has a free end secured by a restraining member to normally maintain the mat in an inoperative position. A release unit enables the retaining unit to release the mat from its inoperative position so that the mat can be unwound from the shaft and moved to its operative position between the vehicle wheels and the road surface. The shock absorbing unit includes a stop member extending parallel to and spaced from the shaft. The stop member inhibits unwinding of the first portion when the apparatus moves into the operative position, and the shock absorbing unit absorbs at least some of the tension to which the mat is subjected when the mat moves under the vehicle wheels. When the mat is partially unwound from the shaft and moved under the wheels, the wheels are prevented from rotating and the mat frictionally engages the surface to brake the vehicle.

12 Claims, 12 Drawing Figures

BRAKING APPARATUS

This invention relates to braking apparatus for vehicles particularly but not exclusively suited for emergency braking situations.

The present invention is particularly applicable for use with large commercial vehicles such as trucks and buses and will be described hereinafter by way of example with reference to its application to such vehicles, but it should be understood that the apparatus may also be used with lightweight vehicles such as cars and motorcycles and the like.

For many years there has been a need for emergency braking apparatus on vehicles independent of the conventional vehicle braking system and attempts have been made to provide such braking apparatus but to date the arrangements have been impractical for reasons of ineffectiveness, cost of installation and/or danger to other road users.

The present invention aims at alleviating the disadvantages associated with such prior art devices and to provide a braking apparatus which will be reliable and efficient in use. Other objects and advantages of this invention will hereinafter become apparent.

With the foregoing and other objects in view, the invention in one aspect resides in a braking apparatus for vehicles having one or more sets of wheels mounted for rotation and a wheel of the or each set being located on each side of the vehicle, said apparatus being movable between an inoperative and an operative position and comprising:

braking mat assembly;

mounting means for securing the assembly relative to a structural member of the vehicle, said assembly including drum means having a shaft, braking mat means having a first wound portion with a free end of said first wound portion secured to the shaft, in use when the apparatus is in the operative position, not all of the first portion being unwound from the shaft, an apron portion of said mat means forming an extension to said first portion, said apron portion having a free end;

retaining means normally securing the free end of the apron portion away from a surface upon which the wheels travel and normally maintaining the mat means in the inoperative position;

release means operative to enable the retaining means to release the mat means from its inoperative position so that said mat means may be unwound from the shaft and move to its operative position between the wheels and the surface; and shock absorbing means operative to absorb at least some of tension to which the mat means is subjected when said mat means moves to its operative position whereby when the mat means moves to its operative position between the wheels and the surface the first portion is unwound from the shaft and the apron portion and the wheels are prevented from rotating and the mat means frictionally engages the surface to brake the vehicle.

In an application wherein there is provided a pair of wheels in the wheel assembly, it is preferred that the mat means extend beneath both wheels. Also where there are provided a pair of spaced wheel assemblies such as on a transaxle, a pair of said mounting assemblies are provided adjacent each laterally spaced wheel assembly and preferably the braking mat means associated with the respective mounting assemblies are interconnected by a cross member. This helps to maintain the braking pads in their operative spaced apart relationship and aids simultaneous placement of the braking mat means beneath the respective wheel assemblies. The cross member may also provide a support for the braking mat means and for this purpose there may be provided retaining means for holding the cross member in an elevated position and release means to enable the cross member with the braking pads attached thereto to move to said operative position. Suitable emergency braking indicators such as flashing lights or the like may be activated upon release of said cross bar or actuation otherwise of said emergency braking apparatus.

In order that this invention may be more readily understood and put into practical effect, reference will now be made to the accompanying drawings which illustrate various preferred embodiments of the invention, wherein.

Figure 1:
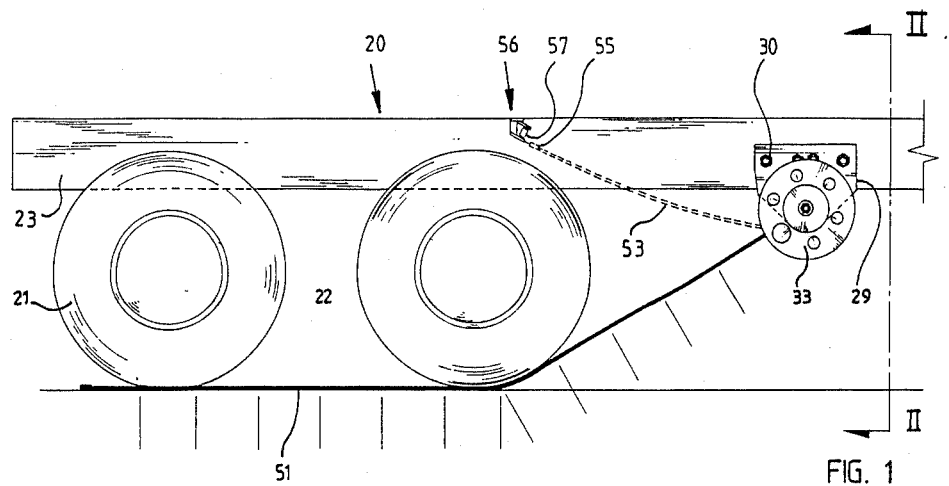
FIG. 1 shows an elevational view of one embodiment of the braking apparatus of the invention.

The rear 20 of a vehicle is shown. The vehicle has two sets 21,22 of dual wheel assemblies mounted for rotation in the usual fashion to the vehicle chassis. The chassis includes longitudinal frame members 23 (only one of which is shown) and a plurality of transversely extending frame members 24 (only one of which is visible). Mud flaps or the like (not shown) may be secured to the chassis adjacent to the wheels.

The apparatus of the invention has a braking mat assembly secured to the chassis by mounting means. As illustrated the mounting means comprise two transversely spaced mountings 26 each having a hanger 27 secured to the chassis, impact pads 28 either side of the free end of the hanger and mounting plates 29. Fasteners such as bolts 30 secure the plates to the hanger and pads. The hanger is welded to the chassis. A transversely extending shaft 32 is held by the mountings 26. This shaft is positioned forward of the rear wheels 21,22. Mounted relative to the shaft are two drum assemblies 33. The drum assemblies 33 are mounted for rotation relative to the shaft about bearing surfaces between the drum assemblies and the shaft. Alternatively bearings 34 may be located between the mountings and shaft 32. A tie rod 35 extends between the drum assemblies and is fixed to each of them to ensure that the drum assemblies rotate together.

Each drum assembly 33 has a shaft 37 and end plates 38. The end plates are provided with a plurality of apertures 39, 40,41,42,43,44. These apertures are either spaced on a common circumference with the distance between one aperture and the next aperture progressively increasing or alternatively the spacings are constant but the radial distance between the apertures and the centre of the shaft decreasing as one travels around the plate. The purpose of this will be described later.

Figure 2:
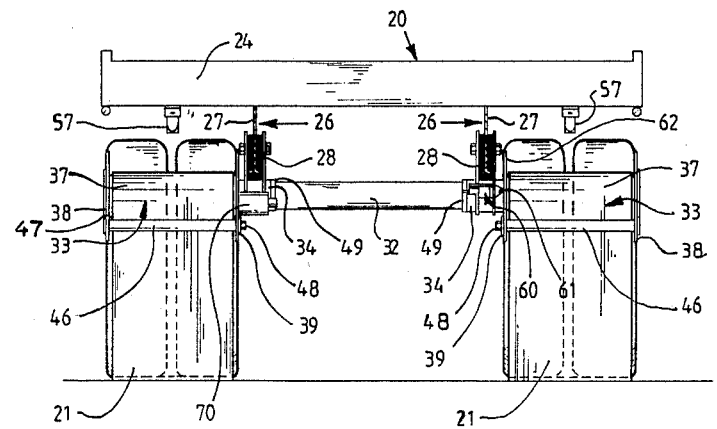
FIG. 2 shows a sectional view taken along line II—II of FIG. 1.
Figures 3A, 3B:
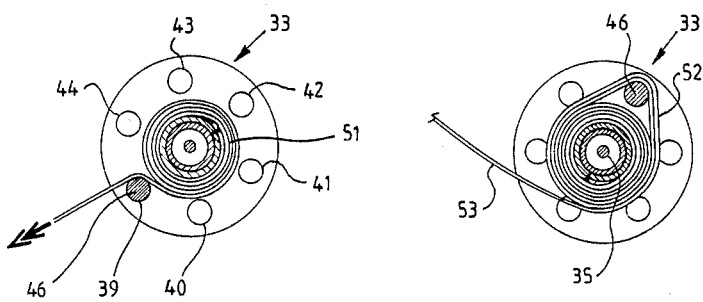
FIGS. 3a and 3b show the position of the drum assembly of the apparatus in the operative and inoperative position respectively.

Each drum assembly 33 of the embodiment of FIGS. 1 to 3 has a stop pin 46. The pin 46 extends between the end plates 38 and is parallel to and spaced from the shaft 37. One end 47 of the pin may be enlarged and the other end threaded to receive a nut 48. In this way the pins 46 may be selectively located in a chosen one of the apertures in the end plates. A locating collar 49 on the shaft 32 ensures that the drum assemblies 33 maintain their relative positions.

Each drum assembly 33 has a braking mat means. Each mat of the embodiment of FIGS. 1 to 3 has three portions—a first wound portion 51, a second wound portion 52 and an apron portion 53. The first portion 51 has an end thereof secured by fasteners to the drum assembly shaft. The first portion 51 consists of a plurality of turns of the mat which, as the mat is unwound from the drum shaft always remain wrapped around the shaft. These turns ensure that the mat always remains firmly secured to the shaft. In this fashion the fasteners are not the sole means relied upon to ensure that the mat is not pulled free—the plurality of remaining turns act as a buffer. It is preferred that three full turns be left on the drum shaft.

The second wound portion 52 forms an extension to the first wound portion of the mat. The second portion 52 comprises a section of the mat wound around both the drum shaft and the stop pin.

The apron portion 53 forms an extension to the second portion 52 and has its free end 55 secured to an attachment point 56 on the vehicle during an inoperative position of the apparatus. The free end of the apron portion is releasably fixed to the chassis by retaining means having a retaining pin 57. The pin passes through a hole in the apron portion and holds the apron portion between it and the flange. It will be seen that a separate retaining means is provided for each mat.

The mat may be provided with a friction increasing tread portion. The tread portion is provided on the underneath surface of the mats.

Release means such as a solenoid (not shown) may be remotely actuated to withdraw the pin 57 from the hole in the apron portion.

A locking device 60 may be employed to lock one of the drum assemblies against rotation. As these assemblies are linked by a tie rod the locking device prevents both assemblies from rotating. The locking device has a pin 61 mounted on a solenoid movable plunger forming part of device 60. A further pin 62 is formed on the end plate of one of the drum assemblies. A web or belt with a buckle (not shown) may extend between these pins and the solenoid, when energised, may release the buckle and allow the drum assemblies to rotate. It should be appreciated that this solenoid and the solenoid of the release means are operated simultaneously.

During operation of the apparatus of the invention according to FIGS. 1 to 3 the drum assemblies 33 are both in the inoperative position shown in FIG. 3 with the apron 53 secured to the chassis by the pin 57 of the retaining means. Both solenoids are then released. As each drum assembly 33 has more weight on one side than the other the drum assemblies rotate initially in the clockwise direction shown by the arrow in FIG. 3. This causes some of the second portion 52 of the mat to be unwound. The apron portion 53 is drawn under the wheels, and the remainder of the second portion 52 is unwound until the mat is extended in a straight line between the wheel 22 and the axis of rotation of the drum assembly 33. This induces a kink in the mat where it passes over the stop pin 46 and the pin prevents further unwinding of the mat. This kinking or deflection coupled with the inertia effect of the drum assembly 33 provides a cushioning or shock absorbing effect due to oscillation of the drum as it steadies in a stable position. Also, the turns of the mat remaining on the drum shaft provide a secure attachment for the mat.

With the arrangement described the free ends of the apron portion 53 of the mats may be secured together by a transversely extending cross member although such a member is not essential.

The stop pins may be positioned in any of the apertures 39,41,42,43,44. The initial position 39 enables the mat to be unwound leaving about 4½ turns of the mat on the drum shaft. After the apparatus has been used for one braking operation two portions of each of the mats may be unduly worn. To ensure that once the mats have been rewound a fresh portion is presented for the next operation the pins may be moved to position 41. The position of the pins may be progressively changed until all available adjustment positions have been exhausted. Thus the mats may be used a plurality of occasions with the final position leaving about three turns of the mat on the drum shaft.

The apparatus includes rewind means. The rewind means may include a rewind motor 70 driving a pinion gear which mates with a ring gear on the shaft or drum assembly. The rewind motor may also be used for unwinding the mats.

Whilst the embodiment described shows the use of two separate drum assemblies linked together it should be appreciated that the drums need not be linked in this way but need merely be caused to operate in unison. Alternatively, the apparatus may have only one drum assembly and this assembly may extend the full width of the vehicle. In such an embodiment the mat may be a full width mat or alternatively may have a first portion of full width and the second and apron portions may be provided by an extension to the full width portion. Two such extensions may be present one on either edge of the full width portion. The free end of the extensions may be linked.

Alternatively, the mat means of FIG. 1 can comprise a web of material extending across the full width of the vehicle to enable the wheels on both sides of the vehicle to rest upon the web when the apparatus is in the operative position, with the shaft extending across the full width of the vehicle.

Figure 4:
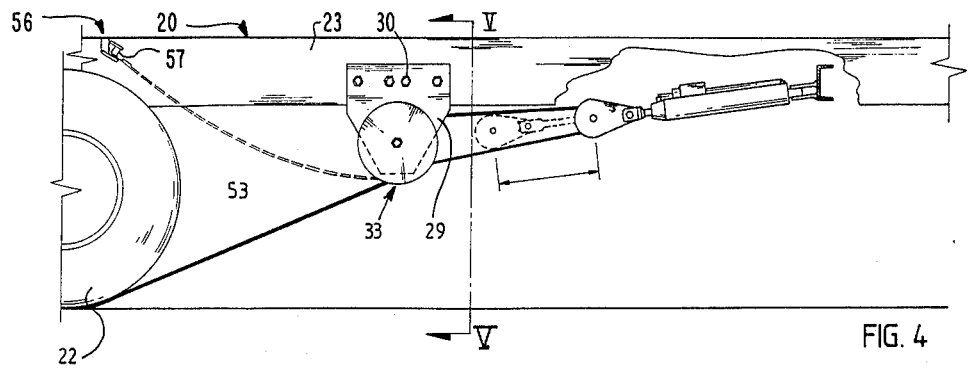
FIG. 4 shows a braking apparatus according to another embodiment of the invention.
Figure 5:
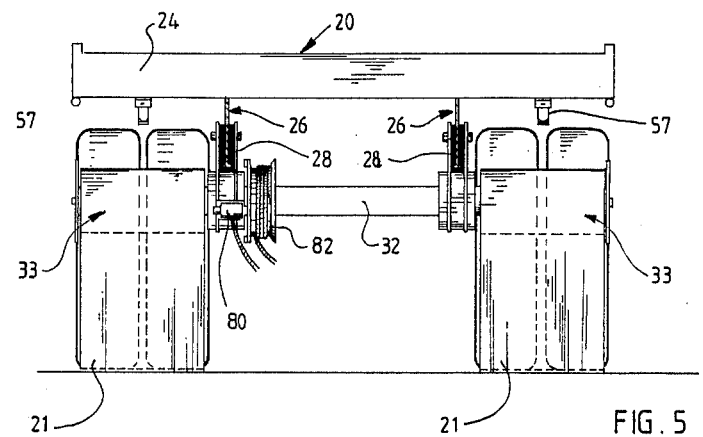
FIG. 5 is a sectional view taken along line V—V of FIG. 4.
Figure 6:
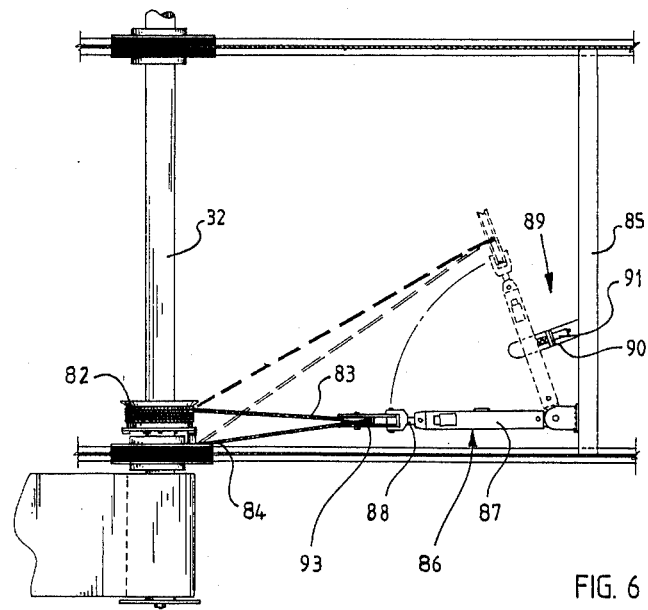
FIG. 6 is a plan view of the apparatus of FIGS. 4 and 5.

In another embodiment illustrated in FIGS. 4, 5 and 6 like numerals are employed to indicate parts in common with that shown in FIGS. 1 to 3. Two drum assemblies 33 are shown. These drums are mounted relative to the shaft 32. The mountings are similar to the embodiment of FIGS. 1 to 3 but have bearings secured to them so that the shaft 32 to which the drums are secured may be free to rotate. A shaft locking device 80 having a solenoid operated pin is secured relative to one of the mountings.

Mounted on the shaft 32 is a reel 82. The reel rotates with the shaft and has a cord, wire chain cable or the like 83 wound around it. One end 84 of the cable 83 is fixed to the mounting, the other to the reel.

Secured to a support member 85 is a cylinder assembly 86 having a cylinder 87 and piston 88. The cylinder assembly may be hydraulically or pneumatically actuated. The cylinder 87 is pivotally secured to the member 85 and may thus pivot towards and away from the reel. The dotted line position in FIG. 6 is the position the cylinder assembly assumes in the inoperative position of the apparatus of the invention. The cylinder assembly is held in this position by a support 89 having a bracket 90 and release device 91. The release device may comprise a catch operated by a solenoid. The free end of the piston 88 of the cylinder assembly has a pulley 93 secured to it. The cable travels over this pulley. The locking pin of device 80 during the inoperative position of the device abuts against the reel 82 and thus the shaft 32 and the drums 33 are prevented from rotating.

During the inoperative position of this embodiment the mats are secured to the chassis at position 56 as for the embodiment of FIGS. 1 to 3. To bring the apparatus to the operative position the solenoids of the locking device 80, release device 91 and of the mat release device are energized. This ensures that the mats are released, the shaft 32 is free to rotate and the cylinder assembly may move from the broken outline position of FIG. 6 to the full outline position of that figure so that the mats may unwind and move between the wheels and the surface upon which they normally travel. Progressive extension of the piston controls the rate of unwinding of the mats and this acts as a shock absorbing arrangement to ensure that the mats are not torn from the drums.

With the cylinder assembly it is possible to progressively release the mats to ensure that the mats wear evenly during braking. Alternatively successively greater lengths of mat may be released during each braking operation so that different portions of the mats are subjected to wear during braking. In either case once a certain number of braking operations have been carried out the mats should be replaced.

It has been found that under extreme braking conditions usually associated with the combination of high speed and heavy vehicle loading, the portion of mat under the vehicle wheels may be subjected to sufficient friction to wear through the mat. In addition, under such severe conditions, the coefficient of friction between the mat and the road surfaces can be substantially reduced as friction induced temperature rises. Tests have shown that an initial coefficient of friction of say 0.2, with the mat at ambient temperature, can drop to 0.02 under extreme braking conditions. At the frictionally induced temperatures attained by the mat material, high rates of wear can occur in synthetic plastics materials or rubber materials as they tend to soften at high temperatures.

In order to alleviate this problem and substantially enhance the braking effect of the invention, it has been found that by feeding out the mat from the drum or roll, a fresh, cool mat surface may be constantly in frictional contact with the road surface. As very substantial tension is applied to the mat during braking, it is preferable to employ a control mechanism which feeds out the mat at a controlled rate regardless of the tension applied to the mat.

In use, when the braking system is actuated, portion of the mat extends to engage between the vehicle wheels and the road surface taking up any slack in the cable or chain 83. As tension is applied to the mat a bleed orifice, acting as a restrictor for flow of fluid in the ram cylinder, effectively controls the extension rate of the piston shaft which in turn controls the rate of extension of the mat as shaft 32 rotates. In this manner, a fresh mat surface is continually fed to the effective braking area between the vehicle wheels and the road surface thus maintaining a high coefficient of friction and ensuring that the mat does not wear through and become ineffective.

It will be appreciated that instead of the cylinder assembly, any other suitable means may be employed for controlling the feed rate of the mat. Such means may include friction brake or clutch assemblies, geared rotational momentum devices, electric or hydraulic motors, etc.

In the FIGS. 1 to 3 and 4 to 6 embodiments it is desired that once the maximum length of the mats have been unwound that a plurality of turns of the mats remain on the respective drums. This ensures that tension on the mats during braking is not born solely by the portion of the mats secured to the drums. Preferably three full turns remain on the drums. Similarly, in the FIGS. 4 to 6 embodiment it is preferred that a plurality of turns, preferably three, of cable remain on the reel at all times.

In FIGS. 4 to 6 the mats have a portion wound onto the drum with a free end thereof secured to the drum. The mats have an apron portion 53 which forms an extension to the wound portion. The free end of the apron portion is secured to the retaining means. To ensure that the apron portion is of sufficient length it is preferred that in the inoperative position the mats hang in catenary fashion between the drum and the retaining means. This is shown by the broken outline position of the mat in FIG. 4.

In an emergency braking situation the apparatus of the invention may be employed to brake the vehicle. In such a situation if the conventional vehicle brakes are simultaneously applied this hinders the effective functioning of the apparatus of the invention. Thus it is desired that the apparatus of the invention cannot be actuated if the conventional brakes are applied. The mats cannot move between the wheels and the road surface if the wheels have locked up. Thus an interlock may be provided to ensure that if the apparatus of the invention is actuated the conventional brakes of the vehicle are rendered inoperative.

Figure 7:
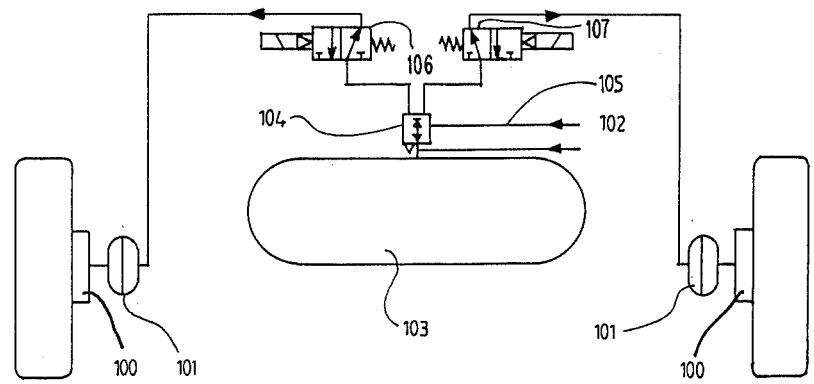
FIG. 7 shows one form of brake control useful with the braking apparatus of the invention.

Conventional brakes are usually one of two types—a type requiring fluid pressure to apply the vehicle brakes or requiring fluid pressure to release the brakes. FIG. 7 explains an interlock arrangement for the former type of braking system.

In FIG. 7 two braking assemblies 100 with boosters 101 are shown. Air from a compressor is fed via line 102 to a receiver 103 and to a regulator 104. A control line 105 controls the action of the regulator.

Solenoid operated valves 106,107 control the flow of air to the boosters and brake assemblies and ensure that when the braking apparatus of the invention is operated the supply of air to the boosters is inhibited. Where the conventional brakes rely on air pressure to release the brakes valves 106,107 may be suitably coupled to ensure that operation of the braking apparatus of the invention operates the solenoid valves to directly couple the compressor line to the boosters.

Figure 8A:
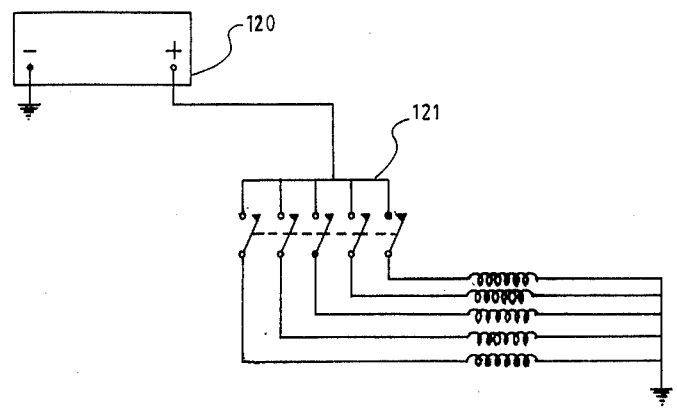
FIGS. 8a and 8b show circuit diagrams for controlling and testing the apparatus of the invention.

FIG. 8a shows one form of electrical control circuit according to the invention. A supply of power such as the vehicle battery 120 is coupled to a five pole contactor or switch 121. The coils shown may be, from top to bottom in the figure, the coils of solenoids for the apron release pins 57 on the left and right of FIGS. 2 and 5 of the drawings, the drum locking device and valves 106,107. An additional coil may be present for the release device 91.

Figure 8B:
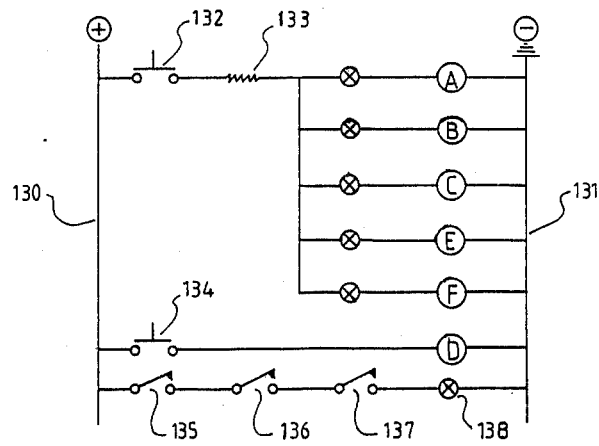

FIG. 8b shows a wiring diagram. Supply is connected between lines 130, 131. A test button 132 and resistor 133 are connected in series with parallel combinations of test lamps and solenoid coils. Coils A,B,C,D,E,and F correspond respectively with the solenoids for the left apron release pin 57, the right apron release pin 57, the drum locking device, the contactor 121 and the coils for valves 106,107. Button 132 when operated causes the test lamps to light if the coils are not open circuited. Button 134 when operated actuates the braking apparatus of the invention and enables the mat to move from its inoperative to its operative position. Limit switches 135,136,137 may be switches positioned along the path the mats take as they move to the operative position and when the mats are in this position the light 138 is illuminated to indicate correct functioning of the apparatus.

Figure 10:
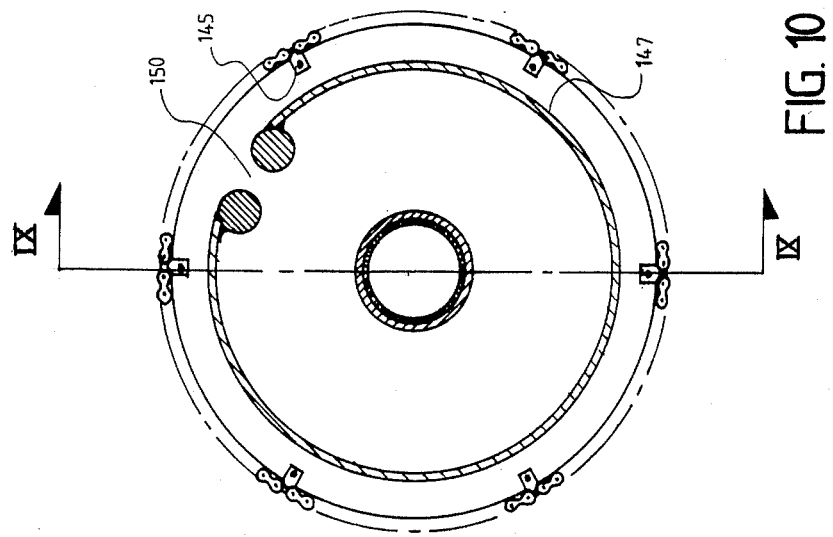
Figure 9:
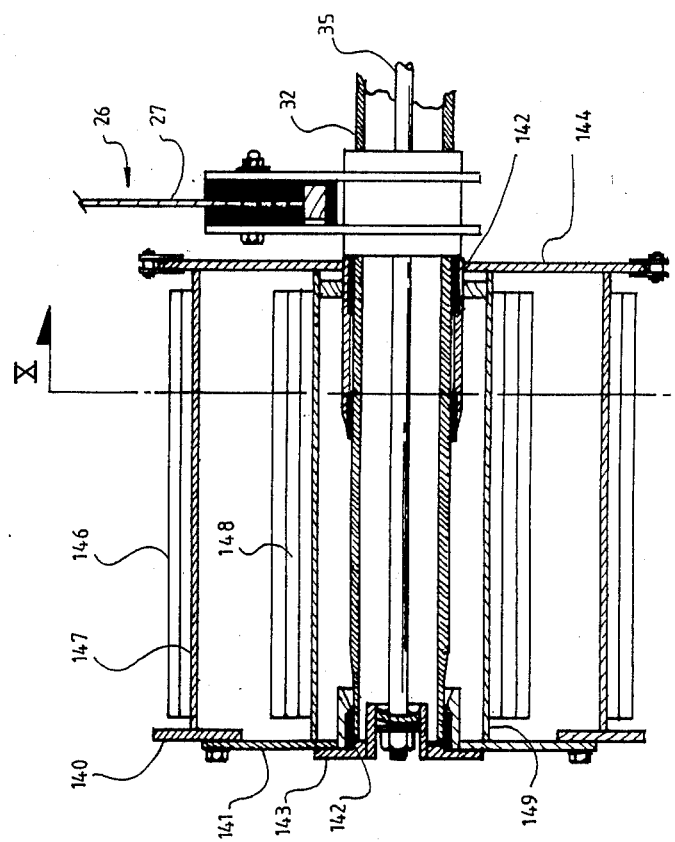
FIG. 9 shows a sectional view taken along line IX—IX of FIG. 10 showing an alternative drum construction; and, FIG. 10 is a sectional view of the drum of FIG. 9 taken along line X—X.

In situations where the apparatus of the invention is used for braking of heavy vehicles a modified drum like that of FIGS. 9 and 10 may be used. This drum may be fixed to the chassis by shaft 32 and mounting 26. The drum has an outer drum portion 140 and an inner drum portion 141. The inner portion is free to rotate about shaft 32 and has bearing bushes between it and the shaft. A tie rod 35 holds cover plate 143 relative to portion 141 and secures the drums on either end of shaft 32 together so that they may rotate together. Flange 144 of the inner portion 141 has a chain secured to it by tabs 145. A gear or sprocket of a rewind mechanism may engage this chain to rewind the mat onto the drum. The mat has a portion 146 which is wound around shaft 147 of the outer drum portion and another portion 148 wound around shaft 149 of the inner portion. Shaft 147 has an opening 150 one edge of which functions like the stop pin 46 of the embodiment of FIGS. 1 to 3 to provide a shock absorbing effect. Thus as the apparatus moves from the inoperative position to the operative position initially portion 146 of the mat is unwound and then the edge of the opening 150 prevents the portion 148 from unwinding. Preferably at least three turns of the mat remain wound around shaft 149.

The modified drum of FIGS. 9 and 10 does not enable adjustment afforded by stop pin 46 and holes 39 to 44. The construction of the drum makes it particularly suited for heavy duty operation.

The mat of the invention may be made of several plies of material and tread may be vulcanized to it in a braking area.

A switch in addition to button 134 may be inserted in conjunction with the hand brake, so that if by accident the hand brake is released it will activate the braking apparatus. Furthermore a separate switch could be arranged in conjunction with the gear shift so that if the shift is accidentally knocked out of gear (whilst driver sleeps), or just jumps out of gear for any reason while the driver is out of the cab, then the apparatus is activated. Preferably, while the truck is parked the mechanism should be left activated (either the forward or reverse mechanism, if both are installed). The truck or vehicle could be parked on the mat for maximum safety. Of course, a second braking apparatus similar to the braking apparatus described could be installed at the rear of the vehicle for emergency stopping in the reverse direction.

Ultimately, a monitoring device for monitoring a sudden drop in blood pressure or other physiological conditions of the driver could be provided to monitor the oncoming of a heart attack, fit, etc. This can be attached to the driver by suction pads and be adapted to actuate the braking apparatus in emergency situations.

Suitably the forward and reverse direction switch will actuate the braking apparatus when two of them are present to ensure that they cannot both be activated at the same time.

The mat is preferably made of suitable material, so as to achieve maximum friction and it may have a tread suitable for wet conditions or for icy conditions a studded belt may be used. The width of the mat is substantially equal to the ground engaging width of the wheel assemblies. This is to ensure that when the mat or mats are released to pass under the wheels the latter are immediately stopped, resting upon the mat or mats, and the vehicle is brought to a skidding halt. In a truck for example the skidding of the vehicle on the mats at each side thereof ensures positive stopping and stopping in a straight line since equal retardation effect is applied to both sides of the vehicle. The weight on the vehicle wheels is totally transferred through the mat ensuring maximum braking. Additionally, since the braked wheels are supported non-rotatably on the mat no tire wear is caused. This is a considerable advantage provided by the present invention since at present in emergency braking situations, flat spots can be worn into expensive tyres making them unserviceable for further use.

Whilst the invention has been illustrated showing a vehicle with dual pairs of wheels the invention may be employed on vehicles having a single set of wheels or more than a dual set of rear wheels.

In cold climates a heating coil may be associated with the release mechanism to ensure that icing-up of that mechanism is avoided.

What is claimed is:

1. A braking apparatus for vehicles having one or more sets of wheels mounted for rotation, a wheel of each set being located on each side of the vehicle, said apparatus being movable between an inoperative and an operative position and comprising:
   a braking mat assembly;
   mounting means for securing the assembly relative to a structural member of the vehicle, said assembly including drum means having a shaft, braking mat means having a first wound portion with a free end of said first wound portion secured to the shaft, an apron portion of said mat means forming an extension to said first portion, said apron portion having a free end;
   retaining means for securing the free end of the apron portion away from a surface upon which the wheels travel to releasably maintain the mat means in the inoperative position;
   release means operative to enable the retaining means to release the mat means from its inoperative position to enable said mat means to be unwound from the shaft and move to said operative position between the wheels and the surface; and
   shock absorbing means comprising a stop member extending substantially parallel to and spaced from said shaft, said mat means having a second portion intermediate said apron portion and said first portion, said second portion being wound around the stop member and the shaft when the apparatus is in the inoperative position, whereby said stop member inhibits unwinding of the first portion when the apparatus moves into the operative position, said shock absorbing means being operative to absorb at least some tension to which the mat means is subjected when said mat means moves to its operative position at which said stop means inhibits unwinding of said first portion, whereby when the mat means moves to its operative position between the wheels and the surface the second portion is unwound from the stop member and shaft to enable the mat means to frictionally engage between the surface and the wheels to prevent the wheels from rotating to thereby brake the vehicle.

2. A braking apparatus as claimed in claim 1 wherein said means includes end members which have a plurality of circumferentially positioned apertures and whereby the stop means may be selectively positioned at locations around the end members to enable select lengths of the first portion to be unwound from the shaft when the apparatus is in the operative position and depending upon the position of the stop member relative to the end members.

3. A braking apparatus as claimed in claim 1 wherein at least three full turns of the first portion remain wound on the shaft when the apparatus is in the operative position.

4. A braking apparatus as claimed in claim 1 wherein the drum means comprise two drums mounted transversely spaced on the shaft, each said drum having a said mat means and said retaining means holding the free ends of each said apron portions normally in the inoperative position.

5. A braking apparatus as claimed in claim 4 wherein the drums are fixed relative to the shaft and the shaft is mounted for rotation relative to the vehicle.

6. A braking apparatus as claimed in claim 4 wherein the drums are mounted for rotation relative to the shaft and the shaft is fixed relative to the vehicle.

7. A braking apparatus as claimed in claim 1 wherein the mat means comprises a web of material extending across the full width of the vehicle to enable the wheels on both sides of the vehicle to rest upon the web when the apparatus is in the operative position, the shaft extends across the full width of the vehicle.

8. A braking apparatus as claimed in claim 1 wherein the shaft is fixed relative to the drum means and they are both rotatable relative to the vehicle.

9. A braking apparatus as claimed in claim 1 wherein the shaft is fixed and the drum means is mounted for rotation relative to the shaft.

10. A braking apparatus as claimed in claim 1 including rewind means for rewinding said mat means on the drum means after a braking operation.

11. A braking apparatus as claimed in claim 1 wherein said drum means comprises two drums mounted relative to the shaft and at spaced locations therealong, each said drum having an outer drum portion with a gap extending along said outer portion, an inner drum portion whereby mat means may be wound around the inner portion, extend out through the gap and be wound around the outer drum portion, an edge of said gap acting as said shock absorbing means as said mat means is unwound from the outer portion.

12. A braking apparatus as claimed in claim 1 including interlock means prohibiting the operation of conventional vehicle braking system when said apparatus is actuated.

* * * * *